I. C. COWLES.
COMPENSATION PENDULUM.
No. 184,230. Patented Nov. 14, 1876.
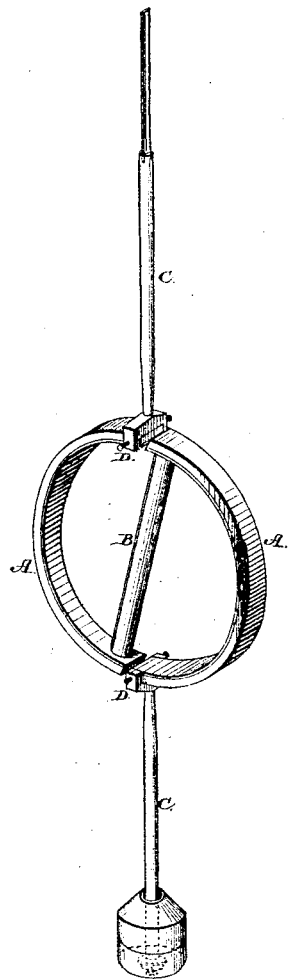

UNITED STATES PATENT OFFICE.

IRVING C. COWLES, OF SYRACUSE, NEW YORK.

IMPROVEMENT IN COMPENSATION-PENDULUMS.

Specification forming part of Letters Patent No. 184,230, dated November 14, 1876; application filed September 9, 1876.

*To all whom it may concern:*

Be it known that I, IRVING C. COWLES, of Syracuse, in the county of Onondaga and State of New York, have invented a new and useful Pendulum for Clocks.

The construction and operation of my invention are fully set forth in the following specification, reference being had to the accompanying drawings, in which is shown a perspective view of my invention.

A A are two curved arms, with inside rim of steel and outside rim of brass, soldered together. The arms A A are joined to the rod B, making a circle, with openings close to opposite sides of the rod B. The steel rods C C are adjustable, and attached to the arms A A by means of slotted clamps and screws D D.

The object of my invention is to produce a pendulum that can be adjusted accurately to compensate for the difference in the temperature, and also be economical in its construction.

The curved arms A A, with inside rim of steel and outside of brass, in a warm temperature, will bend in toward the center of the circle, owing to the brass rim expanding more than the steel rim. The rod B will also expand. The arms A A contracting the circle, and the rod B expanding, will shorten the length of the pendulum, thus compensating for the expanding of the rods C C. In a cold temperature the working of the parts is opposite, but the effect is the same. To adjust it exactly, the rods C C are moved on the arms A A either way, as desired, and held in place by means of the slotted clamps and screws D D.

I claim as my invention—

A pendulum consisting of the curved arms A A, connected by the rod B at opposite ends of the arms A A, on which the adjustable rods C C slide, and are fastened, for the purpose specified.

IRVING C. COWLES.

Witnesses:
 DANIEL ROSENBLOOM,
 JACOB P. MILLER.